United States Patent [19]

Burt

[11] Patent Number: 4,889,543

[45] Date of Patent: Dec. 26, 1989

[54] AIR FILTERING SYSTEM

[76] Inventor: Jerry D. Burt, 2132 Harrell Dr., Oxford, Ala. 36203

[21] Appl. No.: 281,167

[22] Filed: Dec. 8, 1988

[51] Int. Cl.$^4$ .................... B01D 46/10; F03D 11/00
[52] U.S. Cl. ................................. 55/97; 55/279; 55/471; 55/491; 55/511; 416/62; 416/146 R
[58] Field of Search ............... 55/279, 385.1, 400, 55/467, 471, 491, 495, 509, 511, 97; 416/62, 146 R

[56] References Cited

U.S. PATENT DOCUMENTS

| | | | |
|---|---|---|---|
| 2,359,057 | 9/1944 | Skinner | 55/279 |
| 2,812,900 | 11/1957 | Matthews | 416/146 R |
| 2,923,463 | 2/1960 | Shunkwiler | 416/146 R |
| 3,590,629 | 7/1971 | Courbon | 55/400 |
| 3,606,735 | 9/1971 | Baigas, Jr. | 55/511 |
| 3,860,404 | 1/1975 | Jochimski | 55/385 |
| 4,422,824 | 12/1983 | Eisenhardt, Jr. | 55/400 |
| 4,440,000 | 4/1984 | Bacchus et al. | 55/509 |
| 4,450,756 | 5/1984 | Kling | 55/400 |
| 4,477,272 | 10/1984 | Hollis et al. | 55/509 |
| 4,526,592 | 7/1985 | Armbruster | 55/276 |
| 4,596,585 | 6/1986 | Moeller et al. | 55/385 |
| 4,676,721 | 6/1987 | Hardee | 416/62 |
| 4,753,573 | 6/1988 | McKnight | 416/62 |

FOREIGN PATENT DOCUMENTS

| | | | |
|---|---|---|---|
| 641390 | 5/1962 | Canada | 55/400 |
| 196337 | 10/1986 | European Pat. Off. | 55/400 |
| 63-119827 | 5/1988 | Japan | 55/400 |

Primary Examiner—Jay H. Woo
Assistant Examiner—C. Scott Bushey
Attorney, Agent, or Firm—Pollock, Vande Sande & Priddy

[57] ABSTRACT

A device for filtering air in a room equipped with a ceiling fan having rotating blades includes at least one element made of a filtering material which is interconnected between two adjacent blades of the fan by a fastening means.

7 Claims, 2 Drawing Sheets

AIR FILTERING SYSTEM

FIELD OF THE INVENTION

The present invention is concerned with cleaning the air in enclosed areas, and particularly with a filtering system intended to be used with ceiling fans.

BACKGROUND OF THE INVENTION

There has been increased concern over the problem of cleaning and filtering air in order to remove dust, pollen, smoke and other airborne impurities. It has been known to provide devices for the purpose of cleaning and filtering air in residential and commercial spaces to improve the quality of air breathed by inhabitants or users of such spaces.

In buildings having central air-conditioning systems, porous foam, fiberous material such as fiberglass and other materials, have been employed to filter air and these materials to some extent reduce the interior pollution. It has also been known to provide air-filtering means in connection with cooling fans and particularly with ceiling fans which seems to be more effective than fiberglass air filters of air-conditioning systems.

One example of the method and device for reducing the pollution of the air in a room equipped with a ceiling fan is shown in U.S. Pat. No. 4,676,721. As described therein, the ceiling fan has rotating blades covered with porous-dust absorbing fabric covers fitted onto the blades.

Another example is described in U.S. Pat. No. 4,422,824 which relates to a structure of a fan blade for use with a ceiling fan, which among other features, includes filtering pads preferably made of a plastic foam. The pads are located at the leading and trailing edges of the air space between the top and bottom of a hollow blade for the absorption of smoke and other impurities when the air passes through the area close to the ceiling fan location.

There is, however, still a need in the art to provide a simple and inexpensive air filtering system with increased air cleaning efficiency that could be used with different standard ceiling fans already in existence on the market.

SUMMARY OF THE INVENTION

It is a primary object of the present invention to provide a novel device and method for substantially decreasing the air pollution in rooms equipped with ceiling fans.

It is another object of the present invention to provide a simple air filtering system having improved efficiency and good filtering results.

It is still another object of the present invention to provide an air filtering system which is usable with different sizes of standard ceiling and free-standing fans.

It is still another object of the present invention to provide a filtering system which is inexpensive to manufacture, easily mountable on the ceiling fan and adaptable to fit different sizes of the fan blades.

According to the present invention, at least one element made of filtering material extends between the blades of a typical ceiling fan to attract smoke, dust and other impurities, and thereby clean the air in the room. By providing filtering elements between the blades, the area of the filtering surface is increased as compared with prior art devices and therefore, superior filtering results are achieved. The amount of the filtering material that can be attached to an existing ceiling fan is typically greater than the amount in average central air-conditioning and heating system filters.

The provision between the blades of elements made of filtering material results in flow-through filtering in the upper areas of the room. As the small particles of dust, smoke, pollen and the like rise to the upper level of a room, they are drawn through the area of the ceiling fan and are trapped in the filtering system attached to the ceiling fan. The filtering system and a method of the present invention allows separation of lighter particles that might never reach the lower level filtering systems.

Also, as the blades of the cooling fans themselves attract some particles, even when not covered or fitted with filtering materials, the overall performance of the system with separate filtering elements attached between at least some of the blades of the ceiling fan greatly increases the performance of the filtering system.

Other objects and advantages of the present invention will be apparent from the following detailed description of the preferred embodiment taken together with the accompanying drawings.

DETAILED DESCRIPTION OF THE PREFERRED EMBODIMENT(S)

Figure 1:
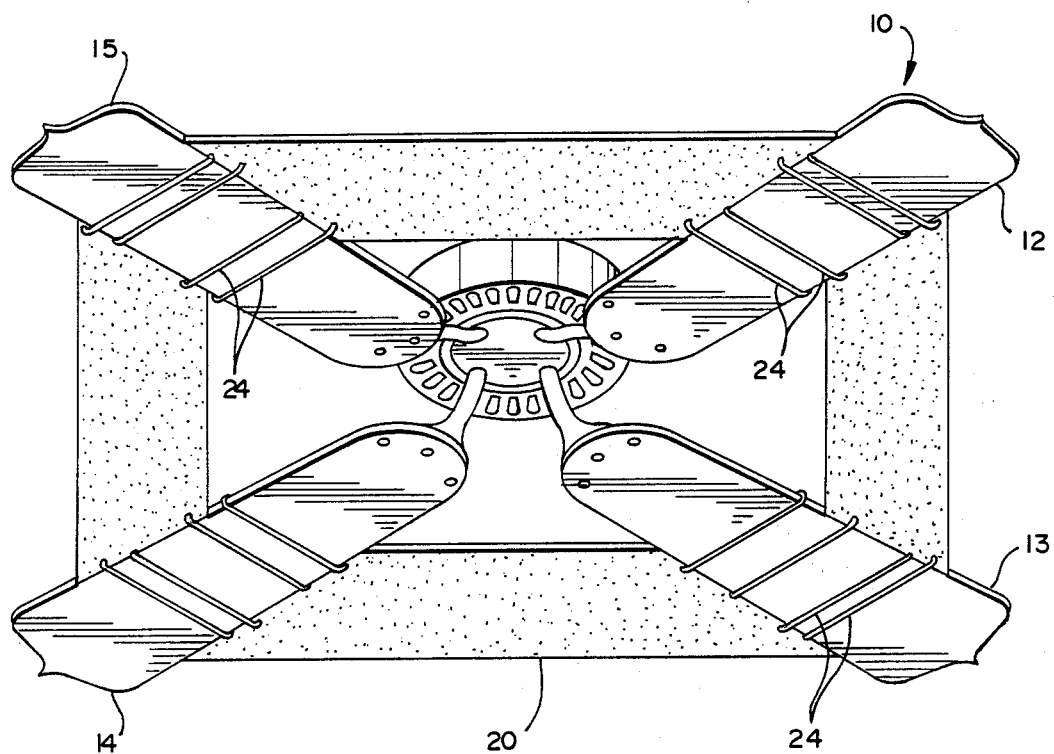
FIG. 1: shows a perspective view of a ceiling fan having four blades and a plurality of filtering elements according to the present invention.

Referring now to the drawings, ceiling fan 10 is shown including four blade elements 12, 13, 14 and 15. Filtering elements 20 are connected between the blades of the ceiling fan 10.

Figure 2:
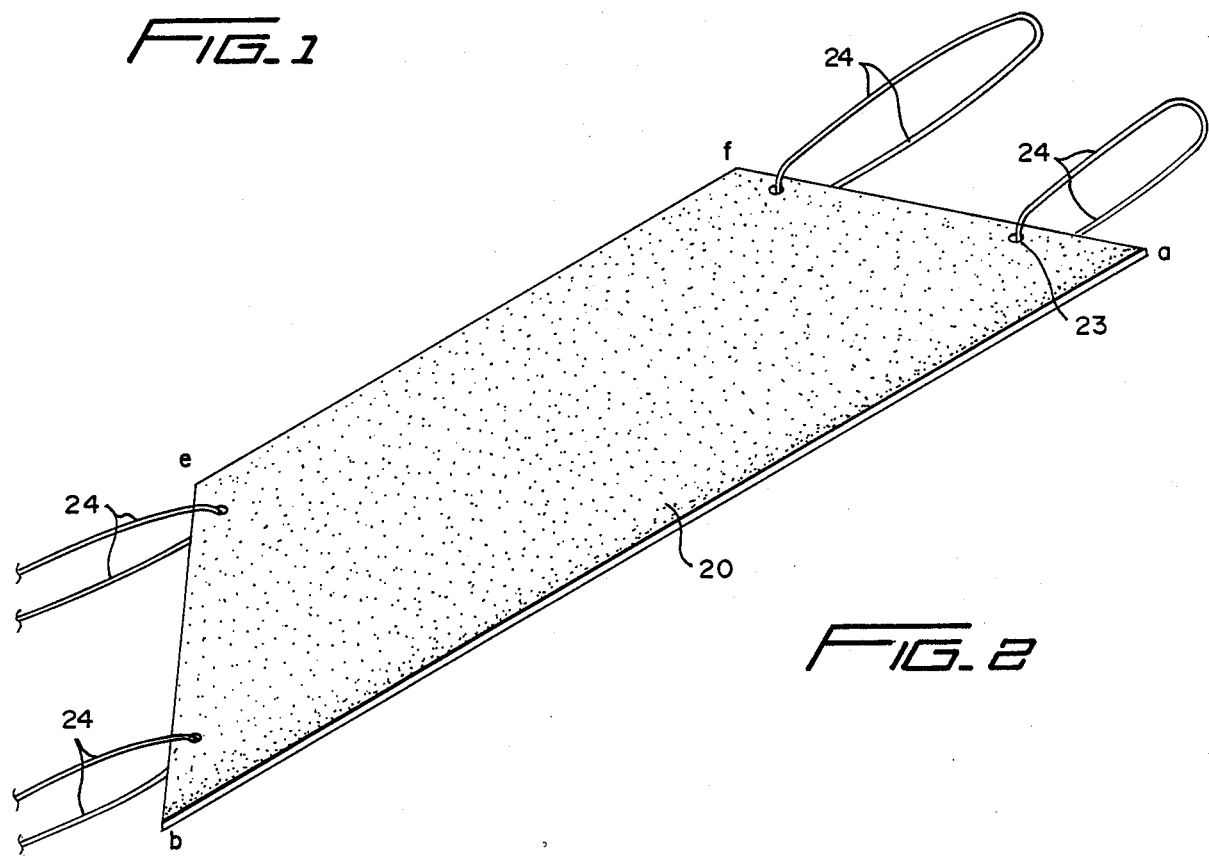
FIG. 2: shows a view of one embodiment of a filtering element according to the present invention.
Figure 3:
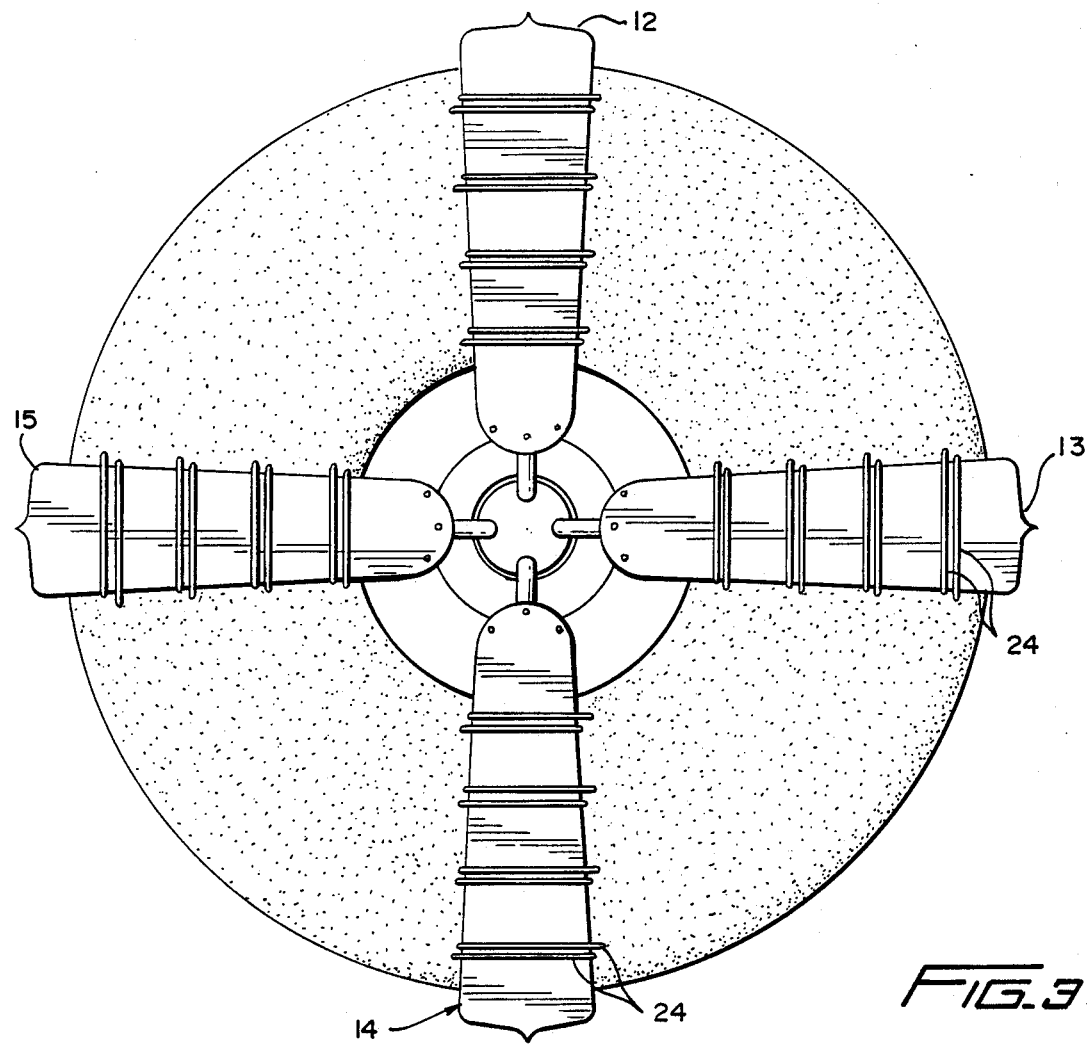
FIG. 3: shows a view of a ceiling fan with a plurality of filtering elements according to a second embodiment of the present invention.

As is apparent from the drawings, different designs of the filter elements can be envisioned. FIGS. 1 and 2 show one preferred embodiment in which filtering elements 20 are designed as having trapezoidal shapes.

Figure 4:
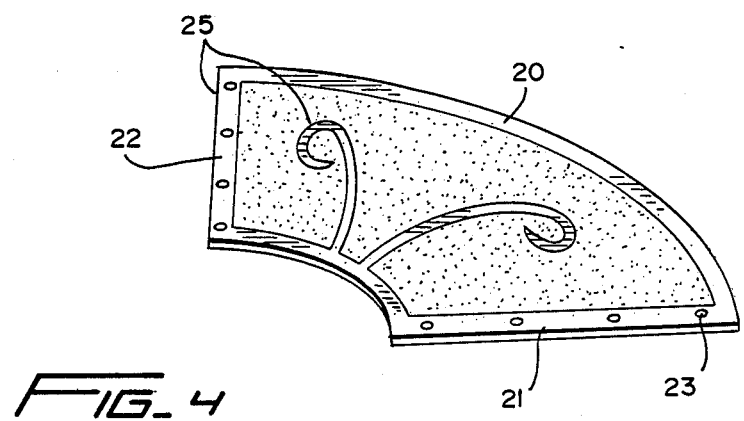
FIG. 4: shows a second embodiment of a filtering element.

The second embodiment of the present invention illustrates elements 20 having a full-skirt design. Another example of the design of a filtering element not shown in the drawings is half of a skirt form. In the second embodiment, stiffening material 25 is provided at the edges 21, 22 of the filtering elements for reinforcement of the edges. Stiffening may also be incorporated into the interior of the filtering material, as shown in FIG. 4. Lightweight plastic or other lightweight material may be used. This technique is helpful in retaining shape of lightweight filtering elements. The appropriate holes 23 are provided in the filtering element along the edges 21, 22 to facilitate fastening of the filtering elements to the blades of the fan. The filtering elements 20 can be connected between one or more blades with two or more elastomeric elements such as, for example, rubber bands 24 extending through holes 23 in the filtering element. Other methods of attaching the filtering elements to the ceiling fan blades can be used and will be readily apparent to workers in the art.

Various colors and patterns for the filter elements can be used to create pleasant effects both when the blades are still (motionless) and during a rotating operation of the cooling fan, and to satisfy the user's aesthetic needs.

Different type of lightweight materials which allow airflow therethrough without a substantial amount of resistance can be used in the filtering system of the present invention. The preferred embodiment employs foam rubber commonly used as filtering material in air-conditioners and/or fans. Such commonly known filters may be modified to fit between the blades of a standard ceiling fan as filtering elements 20. The filtering materials from which the elements are made can be chemically treated in accordance with conventional practice to better attract smoke and other impurities and increase filtering efficiency of the system.

In one preferred embodiment using trapezoidal filtering elements, the base sides designated as a, b and e, f are 26" and 14" long respectively, and the width of the element is about 5½". This embodiment can be easily mounted on a standard ceiling fan referred to and known on the market as S8, 52".

The filtering system of the present invention can be also advantageously used with small portable fans, such as those commonly used in the automobile, and attached to helicopter blades.

Since the surfaces of the blades of cooling fans themselves attract some particles, it is apparent from FIGS. 1–4, that the provision of separate elements made of filtering material between the blades of the fan results in a largely increased filtering area and allows for superior flow-through filtering in the upper areas of the room.

The present invention filtering system results in the separation of lighter particles that might never reach lower level filtering means.

While what is considered to be a preferred embodiment of the present invention has been shown and described, it is understood that various other modifications may be made therein, which fall within the spirit and scope of the present invention as defined in the claims.

I claim:

1. A method for filtering the air in a room equipped with a fan having rotatable blades extending radially from an axial point and spaced apart circumferentially, comprising the steps of:

provision of filtering elements, each positioned between two adjacent circumferentially spaced apart blades;

interconnecting each of said filtering elements along one of opposite sides thereof to respective adjacent blades of the fan by fastening means, whereby movement of the blades with the filtering elements therebetween causes the filtering elements to attract and remove pollution from the room air.

2. In combination with a fan having a plurality of rotating blades, each extending radially from an axial point, said blades being circumferentially spaced apart from each other, a device for filtering air comprising:

at least one element made of a filtering material which is interconnected along its opposite sides between two adjacent circumferentially spaced apart blades of said fan by a fastening means.

3. The device according to claim 2, wherein said filtering material for said at least one element includes a foam rubber.

4. The device according to claim 2 wherein said filtering material is chemically treated to increase its filtering efficiency.

5. A device according to claim 2, wherein said fastening means includes at least one band insertable through apertures located along the edges of said filtering elements.

6. A device according to claim 4, wherein said fastening means includes at least one band insertable through apertures located along the edges of said filtering elements.

7. A device according to claim 5, wherein said edges are provided with reinforcing material.

* * * * *